United States Patent
Badic et al.

(10) Patent No.: US 8,842,782 B2
(45) Date of Patent: Sep. 23, 2014

(54) APPARATUS AND METHOD FOR DECODING A RECEIVED SIGNAL

(75) Inventors: Biljana Badic, Duesseldorf (DE); Tobias Scholand, Muehlheim (DE); Rajarajan Balraj, Duesseldorf (DE); Peter Jung, Duisburg (DE); Guido Horst Bruck, Voerde (DE); Zijian Bai, Duisburg (DE); Stanislaus Iwelski, Cologne (DE)

(73) Assignee: Intel Mobile Communications GmbH, Neubiberg (DE)

( * ) Notice: Subject to any disclaimer, the term of this patent is extended or adjusted under 35 U.S.C. 154(b) by 117 days.

(21) Appl. No.: 13/468,133

(22) Filed: May 10, 2012

(65) Prior Publication Data

US 2013/0301756 A1 Nov. 14, 2013

(51) Int. Cl.
H04L 27/06 (2006.01)

(52) U.S. Cl.
USPC .......................................................... 375/340

(58) Field of Classification Search
None
See application file for complete search history.

(56) References Cited

U.S. PATENT DOCUMENTS

| | | | |
|---|---|---|---|
| 8,396,438 B2 | 3/2013 | Akkarakaran et al. | |
| 2011/0002414 A1 | 1/2011 | Coldrey et al. | |
| 2011/0085627 A1* | 4/2011 | Kangas et al. | 375/346 |
| 2012/0021688 A1* | 1/2012 | Bhattad et al. | 455/63.1 |
| 2012/0052875 A1* | 3/2012 | Kangas et al. | 455/456.1 |
| 2012/0113897 A1* | 5/2012 | Thiele et al. | 370/328 |
| 2013/0002475 A1 | 1/2013 | Keranen et al. | |

OTHER PUBLICATIONS

Jonas Karlsson and Jan Hehegird, "Interference Rejection Combining for GSM", IEEE 1996.*
Cassio B. Ribeiro, Klaus Hugl, Marko Lampinen, Markku Kuusela, "Performance of Linear Multi-User MIMO Precoding in LTE System", IEEE 2008.*
U.S. Appl. No. 13/468,169, filed May 10, 2012 with USPTO.
3GPP. Evolved universal terrestrial radio access (e-utra); physical channels and modulation. Technical Specification 3GPP 36.211 Release-8, 3rd Generation Partnership Project, Sophia Antipolis, Dec. 2009.
3GPP. Evolved universal terrestrial radio access (e-utra); physical layer general description. Technical Specification 3GPP 36.201 Release-8, 3rd Generation Partnership Project, Sophia Antipolis, Dec. 2009.
3GPP. Evolved universal terrestrial radio access (e-utra); physical layer procedures. Technical Specification 3GPP 36.213 Release-8, 3rd Generation Partnership Project, Sophia Antipolis, Dec. 2009.
3GPP. Evolved universal terrestrial radio access (e-utra); physical channels and mod-ulation. Technical Specification 3GPP 36.211 Release-9, 3rd Generation Partnership Project, Sophia Antipolis, Mar. 2010.

(Continued)

*Primary Examiner* — Chieh M Fan
*Assistant Examiner* — Bahman Badipour
(74) *Attorney, Agent, or Firm* — Eschweiler & Associates, LLC

(57) ABSTRACT

An apparatus for decoding a received signal is provided. The received signal has been transmitted by conducting a transmission. The apparatus for decoding includes a detector and a filter application unit. The detector is configured to detect whether the transmission is a SU-MIMO transmission or a MU-MIMO transmission. The filter application unit is configured to apply either a first receive filter or a second different receive filter on the received signal depending on whether the transmission is the SU-MIMO transmission or the MU-MIMO transmission.

13 Claims, 7 Drawing Sheets

(56) References Cited

OTHER PUBLICATIONS

3GPP. Evolved universal terrestrial radio access (e-utra); physical channels and modulation. Technical Specification 3GPP 36.211 Release-10, 3rd Generation Partnership Project, Sophia Antipolis, Dec. 2010.

3GPP. Evolved universal terrestrial radio access (e-utra); physical layer procedures. Technical Specification 3GPP 36.213 Release-9, 3rd Generation Partnership Project, Sophia Antipolis, Mar. 2010.

3GPP. Evolved universal terrestrial radio access (e-utra); physical layer procedures. Technical Specification 3GPP 36.213 Release-10, 3rd Generation Partnership Project, Sophia Antipolis, Dec. 2010.

J. Duplicy, B. Badic, R. Balraj, P. Horvath, F. Kaltenberger, R. Knopp, I. Kovacs, H. Nguyen, D. Tandur and G. Vivier, "MU-MIMO in LTE Systems," EURASIP Journal on Wireless Communications and Networking, vol. 2011, pp. 1-13, Nov. 2010.

Bai et al., "Receiver Performance in MU-MIMO Transmission in LTE", ICWMC'11, Luxembourg, Jun. 2011.

E. Larsson, "Robust structured interference rejection combining" in Proceedings of IEEE Wireless Communications and Networking Conference 2005, vol. 2, New Orleans, LA USA, Mar. 2005, pp. 922-926.

O. Renaudin, V.-M. Kolmonent, P. Vainikainent, and C. Oestges, Impact of correlation matrix estimation accuracy on the computation of stationarity intervals, EuCAP'10 (Barcelona, Spain), Apr. 2010.

Non-Final Office Action dated Nov. 7, 2013 for U.S. Appl. No. 13/468,169. 26 Pages.

Notice of Allowance dated Mar. 14, 2014 for U.S. Appl. No. 13/468,169. 28 Pages.

\* cited by examiner

APPARATUS AND METHOD FOR DECODING A RECEIVED SIGNAL

CROSS-REFERENCE TO RELATED APPLICATIONS

German Patent Application, Application No. 10 2011 054 913.7 which was filed on Oct. 28, 2011, is incorporated herein in its entirety by reference.

FIELD

The present invention relates to an apparatus and method for filtering a received signal and, in particular, to an apparatus and method for filtering a received signal, wherein the received signal has been transmitted by conducting a transmission being either a single-user Multiple Input Multiple Output transmission or a multi-user Multiple Input Multiple Output transmission.

BACKGROUND

Long-Term Evolution (LTE) is the trademark of the Third Generation Partnership Project (3GPP) and is aimed to become the next generation mobile network technology. Since the development of LTE, different transmission modes exist which have been developed to cover different environment scenarios. (See 3GPP 36.211, "Evolved Universal Terrestrial Radio Access (E-UTRA); Physical Channels and Modulation (Release 8)", Sophia Antipolis, 2009, and 3GPP 36.213, "Evolved Universal Terrestrial Radio Access (E-UTRA); Physical layer procedures (Release 8)", Sophia Antipolis, 2009, which are hereby incorporated by reference. The transmission modes can be divided into two groups. The first group provides feedback in terms of channel state information (CSI) from a user equipment (UE) to the evolved NodeB (eNodeB) and is therefore named "closed-loop" transmission. The other group provides no feedback and is named "open-loop" transmission. Furthermore, LTE provides transmission modes, where the eNodeB groups a number of UEs and serves them using the same time-frequency blocks. These transmission modes are called multi-user Multiple Input Multiple Output (MU-MIMO).

The eNodeB performs digital beamforming using a finite set of precoding vectors depending on the number of transmit antenna ports. This approach is particularly advantageous in a dense cell with rare resources. Instead of waiting for free resource blocks, the eNodeB may group UEs and allocate the same resource blocks to prevent waiting periods and therefore increases spectral efficiency. The main drawback of this approach is the increase of mutual interference at each of these two UEs. The signal to both UEs is precoded, summed up and transmitted by the eNodeB, so each user equipment is responsible to filter out its own signal.

If the eNodeB does not find an appropriate candidate for grouping, only a single UE is served by the eNodeB. The UE is unaware if there is another co-scheduled UE, as far as the eNodeB does not provide this information to save transmission bandwidth. In general, the eNodeB does not provide any explicit information on whether the transmission is either a single user-(SU) or multi user-(MU) MIMO transmission. UEs operating in MU-MIMO scenarios may always choose an MMSE (Minimum-Mean-Square-Error) receive filter, although there may be no co-scheduled UE available. Although this receive filter does not fit best, it provides acceptable results, but performs worse when no co-scheduled UE is available.

Therefore, it is highly important to develop receiver algorithms that can determine the presence of a co-scheduled UE at the UE from the received data.

SUMMARY

According to an embodiment, an apparatus for decoding a received signal is provided. The received signal has been transmitted by conducting a transmission. The apparatus for decoding comprises a detector and a filter application unit. The detector is configured to detect whether the transmission is a SU-MIMO transmission or a MU-MIMO transmission. The filter application unit is configured to apply either a first receive filter or a second different receive filter on the received signal depending on whether the transmission is the SU-MIMO transmission or the MU-MIMO transmission.

In an embodiment, an apparatus for filtering a received signal to obtain a filtered signal is provided. The received signal has been transmitted by conducting a transmission. The apparatus comprises a detector and a filter application unit. The detector is configured to detect whether the transmission is either a single-user Multiple Input Multiple Output transmission or a multi-user Multiple Input Multiple Output transmission. The filter application unit is configured to apply a first receive filter with a first filter characteristic on the received signal to obtain the filtered signal when the transmission is the single-user Multiple Input Multiple Output transmission. Moreover, the filter application unit is configured to apply a second receive filter with a second filter characteristic on the received signal to obtain the filtered signal when the transmission is the multi-user Multiple Input Multiple Output transmission.

Embodiments are based on the finding that a first receive filter with a first filter characteristic should be applied for decoding the received signal when the transmission is a single-user Multiple Input Multiple Output transmission, and that a second different receive filter with a second different filter characteristic should be applied for decoding the received signal when the transmission is a multi-user Multiple Input Multiple Output transmission.

According to embodiments, the correct choice of the receive filter depends on the environment, e.g. whether the transmission is either SU- or MU-MIMO. Although the UE is operating in multi-user MIMO mode, e.g. Transmission Mode 5 in LTE, there may be no appropriate UE for co-scheduling available, so MU-MIMO degrades to SU-MIMO. As, however, the eNodeB does not provide any information if either SU- or MU-MIMO is being currently used, it is up to the UE to distinguish between these two modes. Choosing the wrong receiver results in degradation in terms of Bit Error Ratio (BER).

If the transmission is a single-user Multiple Input Multiple Output transmission this may, e.g., mean that the received signal comprises first signal portions for a first user equipment, but not also different second signal portions for a different second user equipment.

If the transmission is a multi-user Multiple Input Multiple Output transmission this may, e.g., mean that the received signal comprises first signal portions for a first user equipment and different second signal portions for a different second user equipment.

In embodiments, a criterion is provided which allows to switch between two different receivers, depending on the availability of the co-scheduled UE. For example, the first receiver may be a Maximum-Ratio-Combiner (MRC) receiver and the second receiver may be a Minimum-Mean- Square-Error (MMSE) receiver. The structure and derivation of both receiver types is well known to a person skilled in the art.

In other embodiments, instead of using an MRC receiver in the SU-MIMO case and instead of using an MMSE receiver in the MU-MIMO case, an IRC, SIC or ML receiver, e.g. Sphere, being adapted for SU-MIMO can be used in the SU-MIMO case, and an IRC, SIC or ML receiver, e.g. Sphere, being adapted for MU-MIMO can be used in the MU-MIMO case (IRC=Interference Rejection Combiner; SIC=Successive Interference Cancel; ML=Maximum Likelihood).

In further embodiments, a mobile communication device is provided. The mobile communication device comprises a baseband processor, an antenna and an apparatus for filtering a received signal, wherein the received signal has been transmitted by conducting a transmission. The apparatus for filtering the received signal comprises a detector and a filter application unit. The detector is configured to detect whether the transmission is either a single-user Multiple Input Multiple Output transmission or a multi-user Multiple Input Multiple Output transmission. The filter application unit is configured to apply a first receive filter with a first filter characteristic on the received signal to obtain the filtered signal when the transmission is the single-user Multiple Input Multiple Output transmission. Moreover, the filter application unit is configured to apply a second receive filter with a second filter characteristic on the received signal to obtain the filtered signal when the transmission is the multi-user Multiple Input Multiple Output transmission.

According to another embodiment, a method for filtering a received signal to obtain a filtered signal is provided. The received signal has been transmitted by conducting a transmission. The method comprises detecting whether the transmission is either a single-user Multiple Input Multiple Output transmission or a multi-user Multiple Input Multiple Output transmission, and applying on the received signal either a first receive filter with a first filter characteristic when the transmission is the single-user Multiple Input Multiple Output transmission, or a second receive filter with a second filter characteristic when the transmission is the multi-user Multiple Input Multiple Output transmission, to obtain the filtered signal.

DETAILED DESCRIPTION

Figure 1:
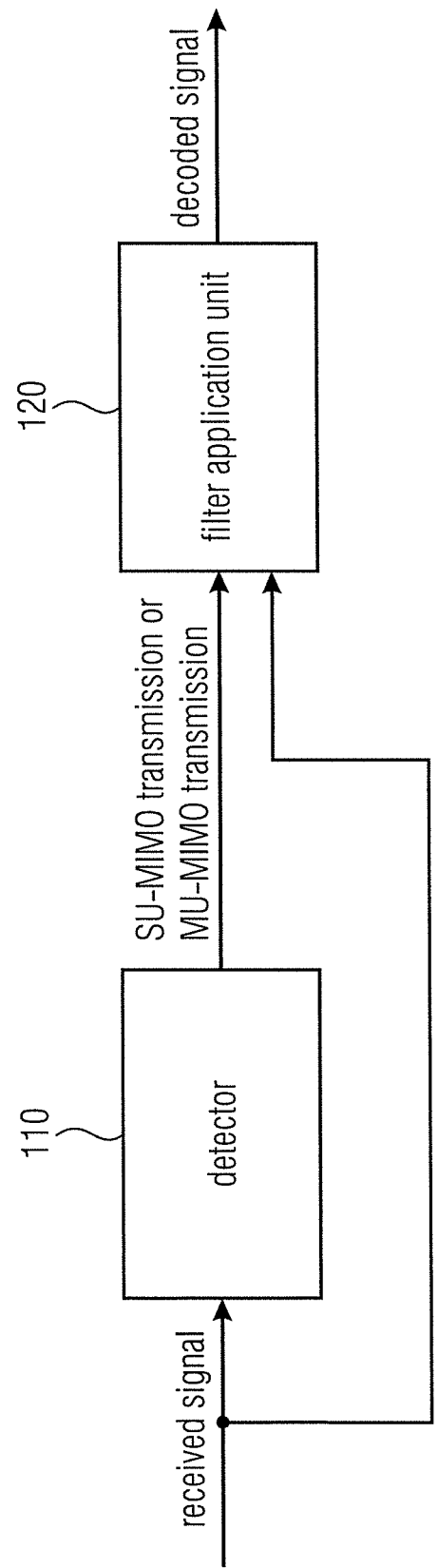
FIG. 1 illustrates an apparatus for decoding a received signal according to an embodiment.

FIG. 1 illustrates an apparatus for filtering a received signal to obtain a filtered signal, wherein the received signal has been transmitted by conducting a transmission. The apparatus comprises a detector 110 and a filter application unit 120.

The detector 110 is configured to detect whether the transmission is either a single-user Multiple Input Multiple Output transmission or a multi-user Multiple Input Multiple Output transmission by examining the received signal. The detector 110 is configured to inform the filter application unit on whether the transmission is a single-user Multiple Input Multiple Output transmission or whether the transmission is a multi-user Multiple Input Multiple Output transmission. If the transmission is a single-user Multiple Input Multiple Output transmission this may, e.g., mean that the received signal comprises first signal portions for a first user equipment, but not also different second signal portions for a different second user equipment. If the transmission is a multi-user Multiple Input Multiple Output transmission this may, e.g., mean that the received signal comprises first signal portions for a first user equipment and different second signal portions for a different second user equipment.

The filter application unit 120 is configured to apply a first receive filter with a first filter characteristic on the received signal when the transmission is a single-user Multiple Input Multiple Output transmission. Moreover, the filter application unit 120 is configured to apply a second receive filter with a second filter characteristic on the received signal when the transmission is the multi-user Multiple Input Multiple Output transmission. For this purpose, the detector 110 passes the information about the detected transmission to the filter application unit 120. By applying either the first receive filter or the second receive filter on the received signal, the filter application unit 120 obtains the decoded signal.

In the following, the transmission model will be described. For notational convenience, scalar values will, in most cases, be denoted by lower case characters. Vectors and matrices will, in most cases, be denoted by lower case and upper case boldface characters, respectively. The Hermitian of a vector or a matrix will be denoted by $(\bullet)^H$. Complex values will, in most cases, be underlined. Furthermore, the expectation operator of a random variable or random vector will be denoted by $E\{\bullet\}$. The trace of a matrix will be denoted by $tr\{\bullet\}$.

The provided concepts may be applied for all MU-MIMO transmission modes, e.g. TM5 in LTE and TM9 in LTE-Advanced. The special feature of MU-MIMO transmission modes is used to transmit a single layer data stream to at least two spatially separated UEs, using the same time-frequency resource blocks. In the following, it is assumed that UE-1 is the target UE, where the co-scheduled UE, UE-2, is aimed to be the interfering UE. This scenario is symmetric. The general equation for this scenario can be described by:

$$\underline{y}_1 = H_1 p_i d_1 + H_1 p_j d_2 + n_1, \quad (1)$$

where the first term is the effective signal intended for UE-1, the second term is the mutual interference and the last term represents noise. The channel from eNodeB to UE-1 is denoted by $H_1$.

Furthermore, the eNodeB uses precoding vector $p_i$, which has been recommended by UE-1 and maximizes the post-SNR (SNR=signal-to-noise ratio) with the channel matrix. The second precoding vector $p_j$ has been recommended by the co-scheduled UE. We assume that the eNodeB pairs only orthogonal UEs, whose precoding vectors have maximal Chordal distance. This assumption is feasible in order to reduce mutual interference seen by UE-1 as much as possible.

The symbols $d_1$ and $d_2$ have the same modulation order. In an embodiment, the recommended modulation orders {4, 16, 64}-QAM are employed. It is further assumed that the symbols and elements of the noise vector are stochastically independent and identically distributed (i.i.d.). For notational simplicity we denote the matrix-vector product $H_1 p_i$ and $H_1 p_j$ by $g_1$ and $d_2$, respectively. Hence, the formula:

$$y_1 = g_1 d_1 + g_2 d_2 + n_1 \tag{2}$$

represents the simplified equation for transmission and is used in the following.

According to some embodiments and depending on whether the transmission is either SU-MIMO or MU-MIMO, either the Maximum-Ratio-Combiner (MRC) receiver or the Minimum-Mean-Square-Error (MMSE) receiver is applied on the received signal. The structure and derivation of both receiver types is well known.

Assuming a SU-MIMO scenario, where no interfering UE is available, according to embodiments, an MRC receiver is applied:

$$m_{MRC}^H = \frac{g_1^H}{g_1^H g_1}, \tag{3}$$

which maximizes the post-SNR, see Bai et al., "Receiver Performance in MU-MIMO Transmission in LTE", ICWMC'11, Luxembourg, June 2011, which hereby incorporated by reference in its entirety.

Further, according to embodiments, in a MU-MIMO scenario, where a co-scheduled user equipment causes interference, a MMSE receiver is employed. The MMSE receiver may be defined according to the formula:

$$m_{MMSE}^H = \frac{g_1^H R_{\eta\eta}^{-1}}{g_1^H R_{\eta\eta}^{-1} g_1} \tag{4}$$

The covariance matrix $R_{\eta\eta}$ is a function of the mutual interference caused by the co-scheduled UE plus noise. Thus:

$$\eta = g_2 d_2 + n_1$$

$$R_{\eta\eta} = E\{\eta \eta^H\} = \sigma_d^2 g_2 g_2^H + \sigma_n^2 I \tag{5}$$

and so, the sum of two matrices is obtained, wherein the two matrices have to be separated to obtain the correct precoding vector $g_2$ of the co-scheduled UE and noise power $\sigma_n^2$.

$\sigma_d$ is either estimated, signaled by the network or a priory known. E.g., for LTE until Release 8, $\sigma_d$ is either estimated or signaled by the network, e.g. as a power offset from a cell specific reference signal. For LTE starting from Release 9, $\sigma_d$ is equal to one.

Figure 2:
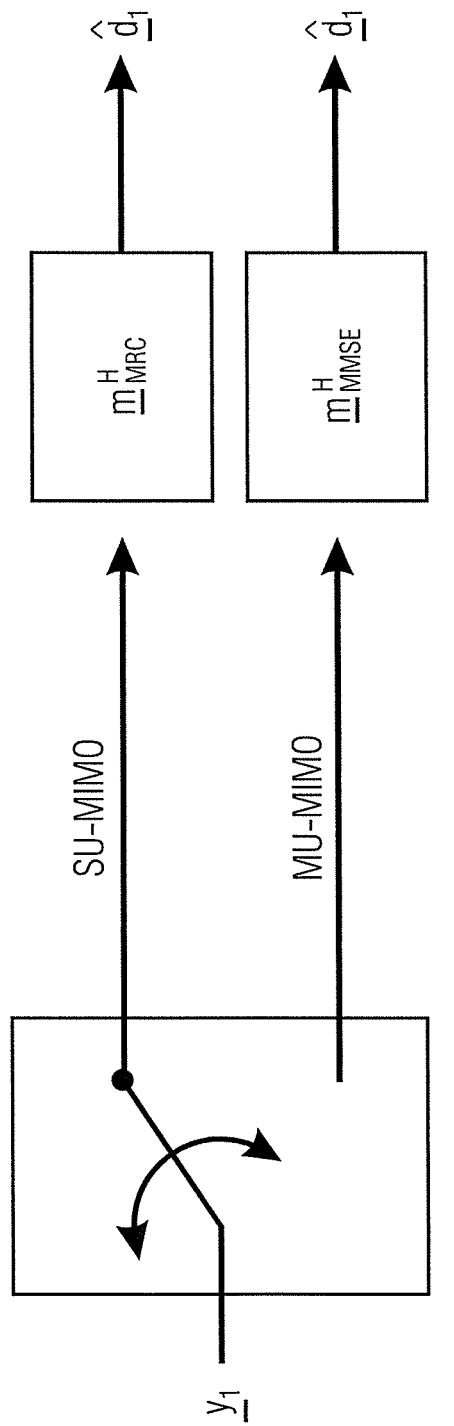
FIG. 2 illustrates an apparatus for decoding a received signal according to another embodiment.
Figure 3:
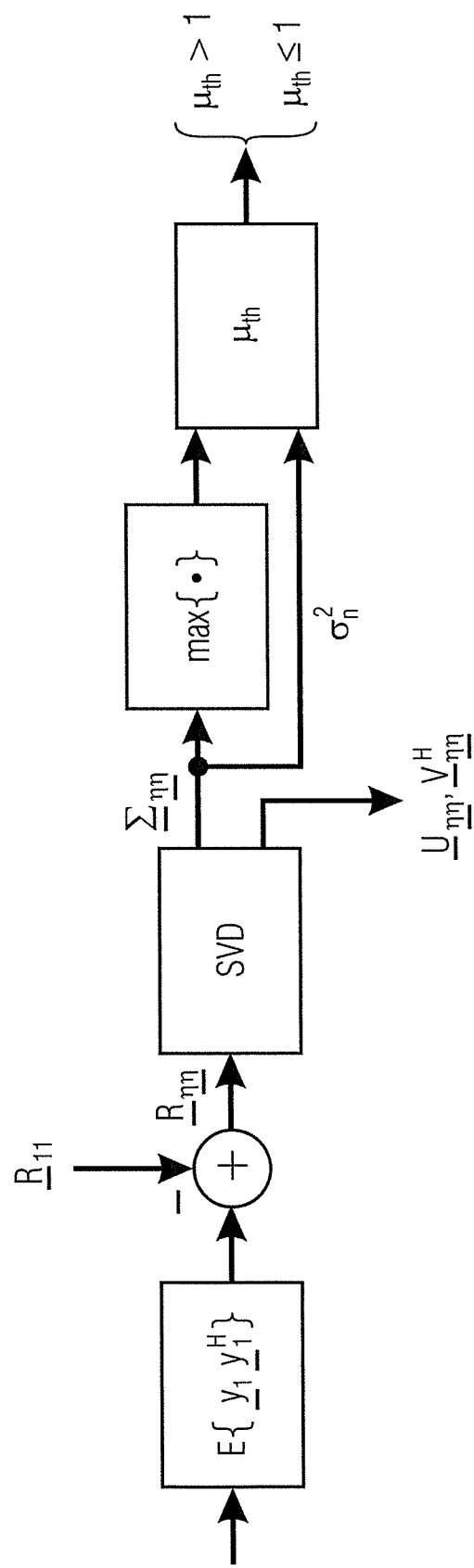
FIG. 3 illustrates an apparatus for decoding a received signal according to a further embodiment.

An adaptive switch is depicted in FIG. 2. According to embodiments, the switch of FIG. 2 is configured to switch depending on whether the transmission is a SU-MIMO or a MU-MIMO transmission. It is differentiated, if a co-scheduled user equipment is present or not. In case of no co-scheduled user equipment, the switch is in the upper position, so the user equipment employs an MRC filter. If the presence of the co-scheduled UE has been detected, the switch flips to the lower position and a MMSE filter will be used. Again, the structure of both, MRC and MMSE receive filters need not be changed. The adaptive switch behaves like a stage before the receive filter.

Now, it is assumed that the co-scheduled user equipment is available. As described in formula (1), the transmitted signal can be separated into the effective-, interference- and noise-signal according to $$y_1 = d_1 g_1 + \eta, \tag{6}$$

where interference plus noise is represented by $\eta$. Each UE knows its own channel and precoding vector. The interference plus noise covariance matrix $R_{\eta\eta}$, can be obtained by $$R_{\eta\eta} = E\{y_1 y_1^H\} - E\{d_1 d_1^* g_1 g_1^H\} \tag{7}$$

$$= R_{y_1 y_1} - \sigma_d^2 g_1 g_1^H.$$

Further, the components of the covariance matrix are denoted by $R_{y_1 y_1} = R_{11} + R_{22} + R_{nn}$. The interference plus noise covariance matrix $R_{\eta\eta}$ becomes a pure noise covariance matrix if the co-scheduled UE is not available. From linear algebra we know that $R_{22} = \sigma_d^2 g_2 g_2^H$, so the rank of this covariance matrix is one and covariance matrix $R_{nn}$ is a diagonal matrix with full rank. Hence, the sum of both matrices has full rank. Calculating the eigenvalues of formula (7) yields $$\det(R_{\eta\eta} - \lambda I) = \det(\sigma_d^2 g_2 g_2^H + \sigma_n^2 I - \lambda I) \tag{8}$$

$$= \det(\sigma_d^2 g_2 g_2^H - (\lambda - \sigma_n^2) I)$$

$$= (\sigma_n^2 - \lambda)^{N_r - 1} (\sigma_d^2 g_2^H g_2 + \sigma_n^2 - \lambda),$$

For the case $\lambda \neq \sigma_n^2$, there exist $N_r - 1$ identical non-zero eigenvalues and for $\lambda = \sigma_n^2$, there exist one non-zero eigenvalue $\lambda = \sigma_d^2 g_2^H g_2 + \sigma_n^2$. Thus:

$$(\lambda - \sigma_n^2) \neq 0 \Rightarrow \lambda = \sigma_d^2 g_2^H g_2 + \sigma_n^2 \tag{9}$$

$$(\lambda - \sigma_n^2) = 0 \Rightarrow \lambda = \sigma_n^2.$$

Using this property, the singular value decomposition of $R_{\eta\eta}$ is computed and formula (10) is obtained $$U_{\eta\eta} \Sigma_{\eta\eta} V_{\eta\eta}^H = R_{\eta\eta} \text{ with} \tag{10}$$

$$\Sigma_{\eta\eta} = \begin{pmatrix} \sigma_n^2 & 0 & 0 & & 0 & \cdots & 0 \\ 0 & \sigma_n^2 & 0 & & 0 & \cdots & 0 \\ 0 & 0 & \sigma_n^2 & & 0 & \cdots & 0 \\ 0 & 0 & 0 & \ddots & & & 0 \\ \vdots & \vdots & \vdots & & \ddots & & \vdots \\ 0 & 0 & 0 & 0 & 0 & & \sigma_{interf}^2 + \sigma_n^2 \end{pmatrix}$$

Furthermore $\Sigma_{\eta\eta}$ contains $N_r - 1$ identical eigenvalues $\sigma_n^2$ and one eigenvalue $\sigma_{interf}^2 + \sigma_n^2 > \sigma_n^2$. In FIG. 2, the approach how to decide, whether the co-scheduled UE is available, is depicted.

In embodiments, $\mu_{th}$ of FIG. 2 is defined according to:

$$\mu_{th} = \frac{\max\{[\Sigma_{\eta\eta}]_{ii}\}}{\sigma_n^2} \begin{cases} \leq 1, \text{ co-scheduled } UE \text{ is not available} \\ > 1, \text{ co-scheduled } UE \text{ is available.} \end{cases} \quad (11)$$

In formula (11), the analytic expression for the adaptive switch is provided. Either the MRC or the MMSE receiver is chosen, depending on whether $\mu_{th} \leq 1$ or whether $\mu_{th} > 1$, respectively. To build the MRC receiver, no additional information from the received data is necessary, as far as the UE knows its channel and precoding vector. $m_{MRC}^H$ can be obtained according to formula (3). In case, that the MMSE receiver is employed, $R_{\eta\eta}$ may have to be established, so $g_2$ and $\sigma_n^2$ have to be determined. Obviously $\sigma_n^2$ is a diagonal element of $\Sigma_{\eta\eta}$ and can be directly obtained from formula (10).

Hence, $$R_{22} = E\{y_1 y_1^H\} - E\{d_1 d_1^*\} g_1 g_1^H - \sigma_n^2 I \quad (12)$$

holds. In German Patent Application, Application No. 10 2011 054 913.7, filed on Oct. 28, 2011, relating to Blind IRC Receiver in LTE Systems, which is hereby incorporated by reference in its entirety, the approach how to obtain $g_2$ is already described. The MMSE receiver can be obtained according to formula (4).

In an ideal system, an infinite number of received data symbols can be assumed. However, this assumption does not hold for a real system, where we have to restrict on a finite set of K received symbols. To differentiate between the ideal and real system, we will use a tilde above the affected scalars, vectors and matrices, respectively to indicate that these values are obtained by estimation. First, we estimate the residual matrix $\tilde{R}_{\eta\eta}$:

$$\tilde{R}_{\eta\eta} = \frac{1}{K} \sum_{i=1}^{K} \underline{y}_{1,i} \underline{y}_{1,i}^H - \sigma_d^2 g_1 g_1^H \quad (13)$$

and calculate $$\tilde{U}_{\eta\eta} \tilde{\Sigma}_{\eta\eta} \tilde{V}_{\eta\eta}^H = \tilde{R}_{\eta\eta} \quad (14)$$

with $$\tilde{\Sigma}_{\eta\eta} = \begin{pmatrix} \tilde{\sigma}_{n,1}^2 & 0 & 0 & 0 & \cdots & 0 \\ 0 & \tilde{\sigma}_{n,2}^2 & 0 & 0 & \cdots & 0 \\ 0 & 0 & \tilde{\sigma}_{n,3}^2 & 0 & \cdots & 0 \\ 0 & 0 & 0 & \ddots & & 0 \\ \vdots & \vdots & \vdots & & \ddots & \vdots \\ 0 & 0 & 0 & 0 & 0 & \tilde{\sigma}_{interf}^2 + \tilde{\sigma}_{n,N}^2 \end{pmatrix},$$

to obtain the interference plus and noise-covariance matrix. We assume that each antenna has a similar noise power. Therefore, an average noise power is defined, for example, according to:

$$\bar{\sigma}_n^2 = \frac{1}{N_r - 1} \sum_{k=1}^{N_r - 1} \tilde{\sigma}_{n,k}^2. \quad (15)$$

Analogously to formula (11), we calculate $$\tilde{\mu}_{th} = \frac{\max\{[\tilde{\Sigma}_{\eta\eta}]_{ii}\}}{\bar{\sigma}_n^2} \begin{cases} \leq 1, \text{ co-scheduled } UE \text{ is not available} \\ > 1, \text{ co-scheduled } UE \text{ is available.} \end{cases} \quad (16)$$

In case of $\tilde{\mu}_{th} \leq 1$ (SU-MIMO), the MRC receiver is determined, e.g., according to formula (3).

In case of $\tilde{\mu}_{th} > 1$ (MU-MIMO), we need to establish $$\tilde{R}_{22} = \frac{1}{K} \sum_{i=1}^{K} \underline{y}_{1,i} \underline{y}_{1,i}^H - \sigma_d^2 g_1 g_1^H - \bar{\sigma}_n^2 I. \quad (17)$$

In German Patent Application, Application No. 10 2011 054 913.7, filed on Oct. 28, 2011, relating to Blind IRC Receiver in LTE Systems, which was earlier incorporated by reference, the approach how to obtain $g_2$ from $\tilde{R}_{22}$ is already described. According to formula (4), the MMSE receiver is obtained.

In the following, simulation results are presented and the performance of different receivers is compared. The following receivers have been taken into account:

TABLE 1

| Analyzed receivers | |
| --- | --- |
| MRC | MRC receiver according to formula (3), if either SU-MIMO or MU-MIMO is used at eNodeB |
| MMSE | MMSE receiver according to formula (4), if either SU-MIMO or MU-MIMO is used at eNodeB; determine $\bar{\sigma}_n^2$ and $g_2$ according to formula (15) and [4], respectively |
| MRC_MMSE_switch (novel filter) | Evaluate formula (16) and decide whether SU-MIMO or MU-MIMO is being used at eNodeB In case of SU-MIMO apply MRC receiver according to formula (3) In case of MU-MIMO apply MMSE receiver according to formula (4), with $\bar{\sigma}_n^2$ and $g_2$ according to formula (15) and [4], respectively |
| optimal_filter | Information whether SU-MIMO or MU-MIMO is used at eNodeB in case of SU-MIMO apply MRC receiver according to formula (3) in case of MU-MIMO apply MMSE receiver according to formula (4), where $\bar{\sigma}_n^2$ and $g_2$ are perfectly known |

The residual simulation parameters are summarized in Table 2:

TABLE 2

| Simulation parameters | |
| --- | --- |
| Parameters | Value |
| Transmission Mode | MU-MIMO |
| System Bandwidth | 10 MHz |
| Channel Model | Single tap Rayleigh fading channel |
| Antenna Array ($N_t \times N_r$) | 4 × 2 and 4 × 4 |
| Channel Estimation | Perfect channel knowledge at the UE |
| Modulation | {4, 16, 64}-QAM |
| Transmission Layers | Single layer per UE |

TABLE 2-continued

Simulation parameters

| Parameters | Value |
|---|---|
| Receiver Type | MRC and MMSE receiver |
| PMI selection | Wideband PMI (one PMI for complete system bandwidth) with Max-PostSNR criterion |
| PMI selection frequency | PMI selection one per subframe |
| Pairing probability | $p_{pairing} \in \{0, 0.2, 0.5, 0.7, 1.0\}$ |
| UE Pairing for MU-MIMO | UE Pairing on maximum Chordal distance criterion |

The novel receiver "MRC_MMSE_switch" is compared with three other reference receivers. These receivers are summarized in Table 1. For the "MRC_MMSE_switch" the switch decides if either the MRC or MMSE receiver is used. In case of SU-MIMO, the MRC receiver serves as a lower bound in terms of BER. Further, an "optimal filter" is introduced to compare the performance of the "MRC_MMSE_switch" receiver. The information which have to be estimated by the "MRC_MMSE_switch" receiver (SU-MIMO; MU-MIMO, $\bar{\sigma}_n^2$ and $g_2$) are perfectly known to the "optimal_filter". Thus, the "optimal_filter" serves as a lower bound in terms of BER.

A scenario with four transmit antenna ports at eNodeB and four and two receive antennas at the UE is analyzed, respectively. In the first scenario with four receive antennas at the UE, 3 eigenvalues are used to determine $\bar{\sigma}_n^2$ according to formula (15) with $N_r-1=3$. However, in the second scenario with two receive antennas at the UE, 1 eigenvalue is used to determine $\bar{\sigma}_n^2$ according to formula (15) with $N_r-1=1$.

Figure 4:
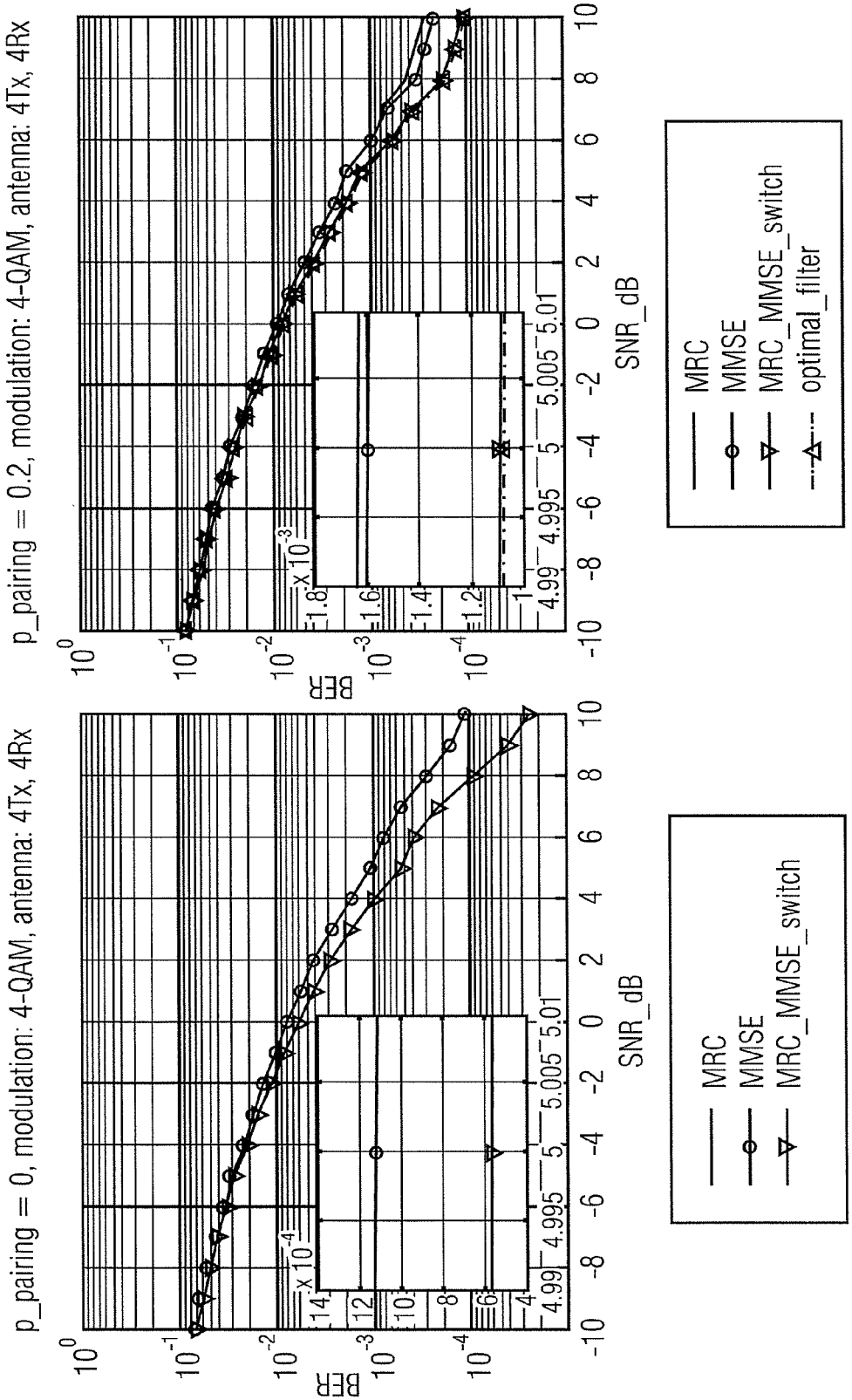
FIG. 4 illustrates BER over SNR for SU-MIMO and MU-MIMO with different pairing probabilities according to an embodiment.
Figure 5:
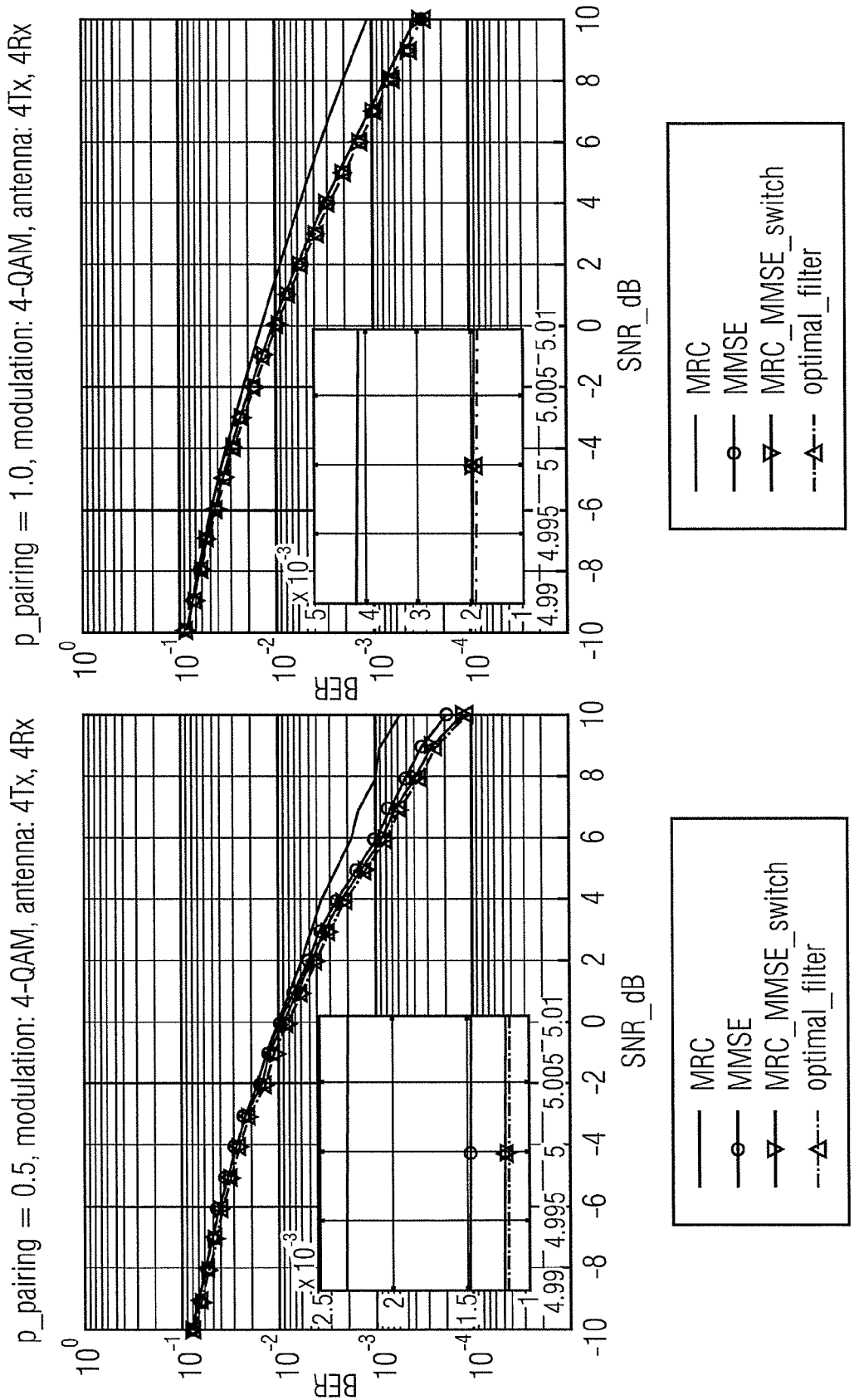
FIG. 5 illustrates BER over SNR for SU-MIMO and MU-MIMO with different pairing probabilities according to another embodiment.
Figure 6:
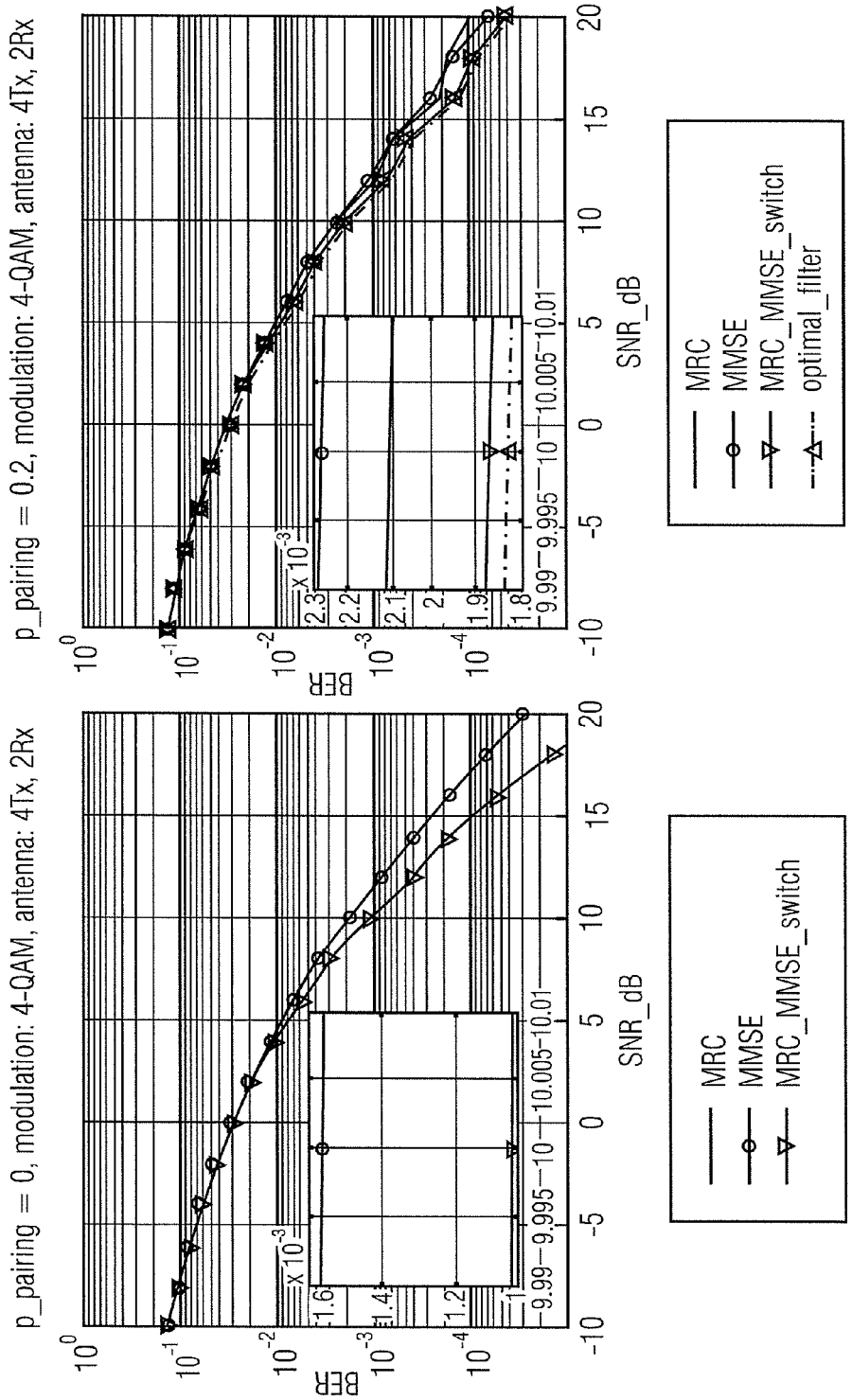
FIG. 6 illustrates BER over SNR for SU-MIMO and MU-MIMO with different pairing probabilities according to a further embodiment.
Figure 7:
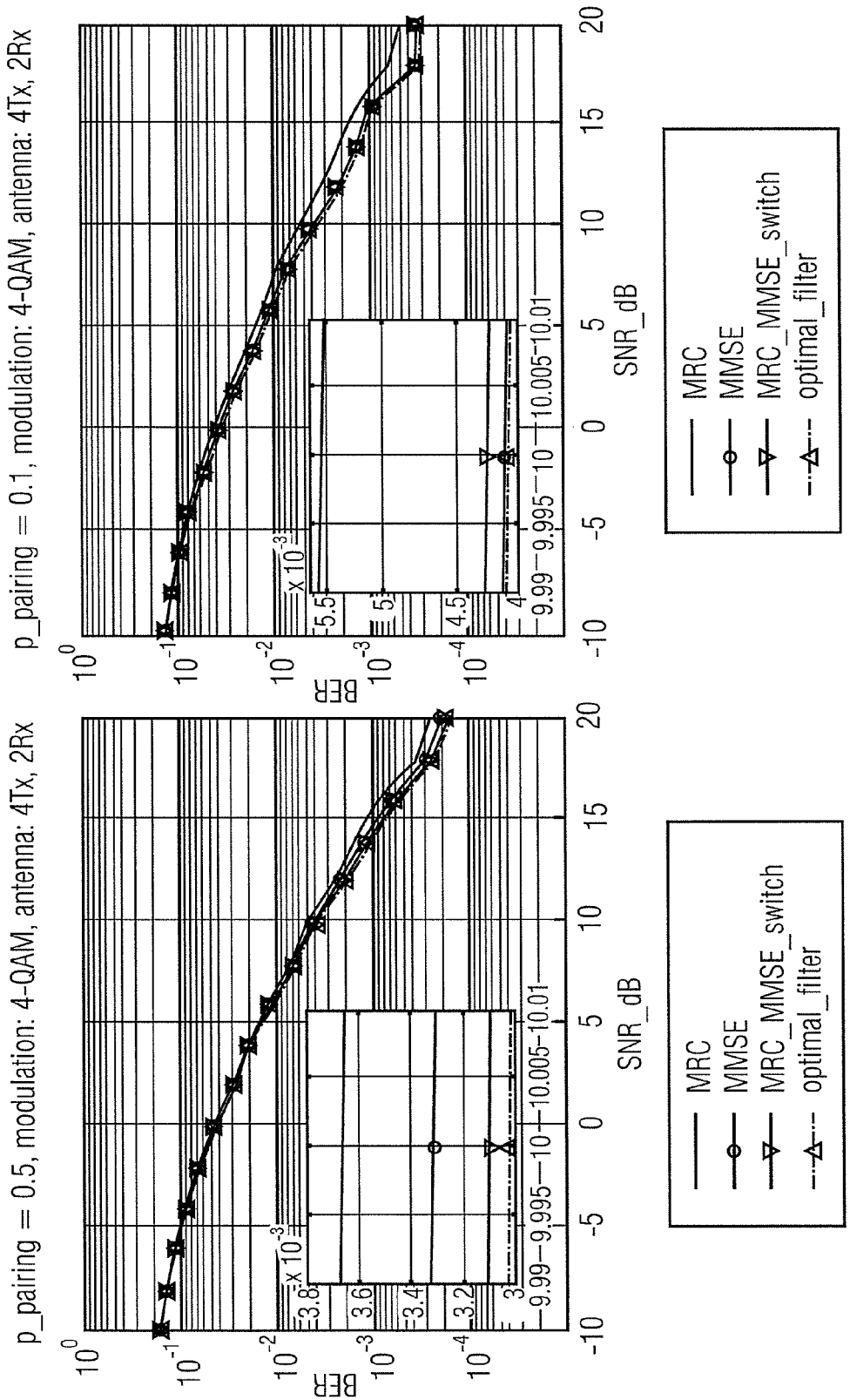
FIG. 7 illustrates BER over SNR for SU-MIMO and MU-MIMO with different probabilities and two receive antennas according to another embodiment.

The simulation results are depicted in FIGS. 4 and 5 in case of four and in FIGS. 6 and 7 in case of two receive antennas, for 4-QAM respectively. From FIGS. 4 to 7, we observe, that the novel "MRC_MMSE_switch" receiver behaves like the MRC receiver in case of SU-MIMO transmission (pairing probability $p_{pairing}=0$). The shape of the MRC curve is overlapping the shape of the "MRC_MMSE_switch" curve. Hence, we observe that the absence of a co-scheduled UE can be determined by analysis of the eigenvalues of the interference plus noise covariance matrix, reliably.

Regarding the case, where a co-scheduled UE is available with different pairing probabilities $p_{pairing} \in \{0.2, 0.5, 1\}$, we observe in FIG. 4, right side; FIG. 5, right side and FIG. 7 that the novel "MRC_MMSE_switch" receiver almost behaves like the "optimal_filter" for four and two receive antennas, respectively. Taking a closer look at the enlarged BER over SNR figure, we recognize that the shape of the curve of the novel "MRC_MMSE_switch" receiver is close to the shape of the curve of the "optimal filter" for both, two and four receive antennas at the UE. This fact contains the following information. First, we can distinguish between SU-MIMO and MU-MIMO reliably. Second, $\bar{\sigma}_n^2$ and $g_2$ are determined correctly.

According to the provided concepts presented above, the presence of a co-scheduled UE can be determined at the UE from the received data. This information is necessary for transmission modes, which support MU-MIMO. If the eNodeB cannot find an appropriate candidate for co-scheduling, only one UE is being served by this eNodeB. This UE assumes the presence of another co-scheduled UE, although there is none and selects the wrong receiver.

As described above, the presence or absence of the co-scheduled UE can be directly determined based on the received data. This property comes along with properties of the interference plus noise covariance matrix of the received data. Thus, we developed a switch, which decides adaptively whether a co-scheduled UE is available or not. Assume a co-scheduled user equipment is not available, the switch decides to use the MRC filter. On the other hand, if the co-scheduled user equipment is available, the adaptive switch decides to use the MMSE filter. This adaptive switch represents the core of this disclosure. The adaptive switch is applied before the receive filter and, thus does not affect the receive filter.

The performance and properties of the adaptive switch have been analyzed by simulation. In both cases using two and four receive antennas at the user equipment, the novel "MRC_MMSE_switch" receiver performs close to the "optimal_filter", which is the lower bound in terms of bit error ratio. Hence we conclude that the novel approach is able to differentiate between SU-MIMO and MU-MIMO reliably and, in case of MU-MIMO determines the missing parameters correctly to establish the receive filter.

This novel receiver structure has the potential to reduce the number of bit errors in MU-MIMO transmission modes by choosing the correct receive filter. The adaptive switch is applied before the receive filter, so it does not affect its structure. This is the case why it is easy to integrate it as a primary stage before the receive filter Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for filtering a received signal to obtain a filtered signal, wherein the received signal has been transmitted by conducting a transmission, wherein the apparatus comprises:
a detector configured to detect whether the transmission is either a single-user Multiple Input Multiple Output transmission or a multi-user Multiple Input Multiple Output transmission, and
a filter application unit, wherein the filter application unit is configured to apply a first receive filter with a first filter characteristic on the received signal to obtain the filtered signal when the transmission is the single-user Multiple Input Multiple Output transmission, and wherein the filter application unit is configured to apply a second receive filter with a second, different filter characteristic on the received signal to obtain the filtered signal when the transmission is the multi-user Multiple Input Multiple Output transmission,
wherein the detector is configured to determine whether a ratio of a maximum of main-diagonal coefficients of an interference-plus-noise covariance matrix and an average noise power is greater than one to determine whether the transmission is the multi-user Multiple Input Multiple Output transmission or the single-user Multiple Input Multiple Output transmission,
wherein the filter application unit is configured to apply a Minimum-Mean-Square-Error receive filter as the second receive filter on the received signal when the transmission is the multi-user Multiple Input Multiple Output transmission, the Minimum-Mean-Square-Error receive filter being defined according to $$\underline{m}_{MMSE}^H = \frac{\underline{g}_1^H R_{\overline{\eta\eta}}^{-1}}{\underline{g}_1^H R_{\overline{\eta\eta}}^{-1} \underline{g}_1}$$

as the second receive filter on the received signal when the transmission is the multi-user Multiple Input Multiple Output transmission,
wherein $g_1$ denotes a matrix-vector product $H_1 p_i$, wherein $H_1$ denotes the channel from an eNodeB to a user equipment, wherein $p_i$ denotes a precoding vector recommended by the user equipment, wherein $g_1^H$ denotes a Hermitian of the matrix-vector product $g_1$, and wherein $R_{\overline{\eta\eta}}^{-1}$ denotes an inverse matrix of a covariance matrix $R_{\overline{\eta\eta}}$.

2. An apparatus according to claim 1,
wherein the detector is configured to detect that the transmission is the single-user Multiple Input Multiple Output transmission when the received signal does not comprise signal components for a co-scheduled user equipment, and
wherein the detector is configured to detect that the transmission is the multi-user Multiple Input Multiple Output transmission when the received signal does comprise signal components for at least one co-scheduled user equipment.

3. An apparatus according to claim 1, wherein the filter application unit is configured to apply a Maximum-Ratio-Combiner receive filter as the first receive filter on the received signal when the transmission is the single-user Multiple Input Multiple Output transmission.

4. An apparatus according to claim 3, wherein the filter application unit is configured to apply the Maximum-Ratio-Combiner receive filter being defined according to $$\underline{m}_{MRC}^H = \frac{\underline{g}_1^H}{\underline{g}_1^H \underline{g}_1},$$

as the first receive filter on the received signal when the transmission is the single-user Multiple Input Multiple Output transmission.

5. An apparatus according to claim 1, wherein the detector is configured to detect that the transmission is the multi-user Multiple Input Multiple Output transmission when the received signal comprises interference signal components.

6. An apparatus according to claim 5, wherein the detector is configured to detect that the transmission is the single-user Multiple Input Multiple Output transmission when the received signal comprises no interference signal components.

7. An apparatus for filtering a received signal to obtain a filtered signal, wherein the received signal has been transmitted by conducting a transmission, wherein the apparatus comprises:
a detector configured to detect whether the transmission is either a single-user Multiple Input Multiple Output transmission or a multi-user Multiple Input Multiple Output transmission, and
a filter application unit, wherein the filter application unit is configured to apply a first receive filter with a first filter characteristic on the received signal to obtain the filtered signal when the transmission is the single-user Multiple Input Multiple Output transmission, and wherein the filter application unit is configured to apply a second receive filter with a second, different filter characteristic on the received signal to obtain the filtered signal when the transmission is the multi-user Multiple Input Multiple Output transmission, wherein the detector is configured to detect that the transmission is the multi-user Multiple Input Multiple Output transmission when a maximum of main-diagonal coefficients of an interference-plus-noise covariance matrix is greater than an average noise power, and wherein the detector is configured to detect that the transmission is the single-user Multiple Input Multiple Output transmission when the maximum of the main-diagonal coefficients of the interference-plus-noise covariance matrix is not greater than the average noise power, wherein the detector is configured to determine the interference-plus-noise covariance matrix by conducting a singular value decomposition of a residual matrix $\tilde{R}_{\eta\eta}$ being defined as $$\tilde{R}_{\eta\eta} = \frac{1}{K}\sum_{i=1}^{K} \underline{y}_{1,i}\underline{y}_{1,i}^H - \sigma_d^2 \underline{g}_1 \underline{g}_1^H$$

wherein $y_{1,i}$ is an i-th component of the received signal, wherein $y_{1,i}^H$ is an i-th component of a Hermitian signal of the received signal.

8. An apparatus according to claim 7, wherein the detector is configured to determine the interference-plus-noise covariance matrix $\tilde{\Sigma}_{\eta\eta}$ by conducting the singular value decomposition of the residual matrix $\tilde{R}_{\eta\eta}$ according to:

$$\tilde{U}_{\eta\eta}\tilde{\Sigma}_{\eta\eta}\tilde{V}_{\eta\eta}^H = \tilde{R}_{\eta\eta}.$$

9. An apparatus according to claim 8, wherein the detector is configured to detect that the transmission is the multi-user Multiple Input Multiple Output transmission when the maximum of the main-diagonal coefficients of the interference-plus-noise covariance matrix is greater than the average noise power, wherein the maximum of the main-diagonal coefficients is defined as:

$$\max\{[\tilde{\Sigma}_{\eta\eta}]_{ii}\},$$

wherein the average noise power is defined as:

$$\overline{\sigma}_n^2 = \frac{1}{N_r - 1}\sum_{k=1}^{N_r-1} \tilde{\sigma}_{n,k}^2,$$

and wherein the detector is configured to detect that the transmission is the single-user Multiple Input Multiple Output transmission when the maximum of the main-diagonal coefficients of the interference-plus-noise covariance matrix is not greater than an average noise power.

10. An apparatus according to claim 1, wherein the detector is configured to determine that the transmission is the multi-user Multiple Input Multiple Output transmission when a ratio of a maximum of main-diagonal coefficients of an interference-plus-noise covariance matrix and an average noise power is greater than one.

11. An apparatus according to claim 10, wherein the detector is configured to determine that the transmission is the single-user Multiple Input Multiple Output transmission when a ratio of a maximum of main-diagonal coefficients of an interference-plus-noise covariance matrix and an average noise power is not greater than one.

12. An apparatus according to claim 11, wherein the maximum of the main-diagonal coefficients is defined by:

$$\max\{[\tilde{\Sigma}_{\eta\eta}]_{ii}\},$$

wherein the average noise power is defined by:

$$\overline{\sigma}_n^2 = \frac{1}{N_r - 1}\sum_{k=1}^{N_r-1} \tilde{\sigma}_{n,k}^2,$$

and wherein the ratio is defined by:

$$\tilde{\mu}_{th} = \frac{\max\{[\tilde{\Sigma}_{\eta\eta}]_{ii}\}}{\overline{\sigma}_n^2}.$$

13. An apparatus for filtering a received signal to obtain a filtered signal, wherein the received signal has been transmitted by conducting a transmission, wherein the apparatus comprises:

a detector configured to detect whether the transmission is either a single-user Multiple Input Multiple Output transmission or a multi-user Multiple Input Multiple Output transmission, and a filter application unit, wherein the filter application unit is configured to apply a first receive filter with a first filter characteristic on the received signal to obtain the filtered signal when the transmission is the single-user Multiple Input Multiple Output transmission, and wherein the filter application unit is configured to apply a second receive filter with a second, different filter characteristic on the received signal to obtain the filtered signal when the transmission is the multi-user Multiple Input Multiple Output transmission, wherein the filter application unit is configured to apply a Maximum-Ratio-Combiner receive filter as the first receive filter on the received signal when the transmission is the single-user Multiple Input Multiple Output transmission, and wherein the filter application unit is configured to apply a Minimum-Mean-Square-Error receive filter as the second receive filter on the received signal when the transmission is the multi-user Multiple Input Multiple Output transmission, wherein the filter application unit is configured to apply the Maximum-Ratio-Combiner receive filter being defined according to $$m_{MRC}^H = \frac{\underline{g}_1^H}{\underline{g}_1^H \underline{g}_1},$$

as the first receive filter on the received signal when the transmission is the single-user Multiple Input Multiple Output transmission, and wherein the filter application unit is configured to apply the Minimum-Mean-Square-Error receive filter being defined according to $$m_{MMSE}^H = \frac{g_1^H R_{\eta\eta}^{-1}}{g_1^H R_{\eta\eta}^{-1} g_1}$$

as the second receive filter on the received signal when the transmission is the multi-user Multiple Input Multiple Output transmission, wherein $g_1$ denotes the matrix-vector product $H_1 p_i$, wherein $H_1$ denotes the channel from an eNodeB to a user equipment, wherein $p_i$ denotes a precoding vector recommended by the user equipment, wherein $g_1^H$ denotes a Hermitian of the matrix-vector product $g_1$, and wherein $R_{\eta\eta}^{-1}$ denotes an inverse matrix of a covariance matrix $R_{\eta\eta}$.

* * * * *